United States Patent
Critelli et al.

(10) Patent No.: US 7,349,115 B2
(45) Date of Patent: Mar. 25, 2008

(54) METHOD AND SYSTEM FOR TRACING CORPORATE MAIL

(75) Inventors: Michael J. Critelli, Darien, CT (US); Leon A. Pintsov, West Hartford, CT (US); Frederick W. Ryan, Jr., Oxford, CT (US); Ian A. Siveyer, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1042 days.

(21) Appl. No.: 10/608,962

(22) Filed: Jun. 27, 2003

(65) Prior Publication Data
US 2004/0263901 A1 Dec. 30, 2004

(51) Int. Cl.
*G06F 3/12* (2006.01)
*G06K 15/00* (2006.01)

(52) U.S. Cl. .............................. 358/1.15; 358/1.18
(58) Field of Classification Search ............... 358/1.15, 358/1.18, 1.1, 1.13, 402, 1.14; 382/100, 382/101, 102, 103
See application file for complete search history.

(56) References Cited

U.S. PATENT DOCUMENTS 6,496,806 B1    12/2002   Horwitz et al. ............... 705/28
6,574,000 B1    6/2003    Sansone ....................... 358/1.1
2001/0032190 A1   10/2001   Ediger et al. .................. 705/62
2001/0040513 A1   11/2001   McDonald ............. 340/825.49

FOREIGN PATENT DOCUMENTS

JP     2005128710 A   *   5/2005

\* cited by examiner

*Primary Examiner*—Dov Popovici
(74) *Attorney, Agent, or Firm*—Brian A. Lemm; Angelo N. Chaclas (57) ABSTRACT

A method and system that enables the accurate identification of the originator of a mail piece within a corporate mail room environment is provided. Each person that generates mail items is provided with tracking information to be placed on each mail item. The tracking information can include, for example, an employee identification number, an equipment identification number and a unique sequence number. When the mail item is received in the corporate mail room, the tracking information is scanned and the tracking information is associated with a unique aspect of the mail item. Utilizing the tracking information associated with each mail item, the ambiguity of origination of each mail item is removed as there is now a verifiable record of the originator and/or originating equipment.

69 Claims, 4 Drawing Sheets

METHOD AND SYSTEM FOR TRACING CORPORATE MAIL

FIELD OF TH INVENTION

The invention disclosed herein relates generally to the processing of mail, and more particularly to a method and system to accurately identify the originator of a mail piece in an environment in which mail is collected from multiple sources before being placed in the mail stream.

BACKGROUND OF THE INVENTION

The United States currently has the world's largest postal system, which handles billions of pieces of mail each year. The servicing of mail delivery involves three general steps: collection, sorting, and delivery. Collection takes place through a series of local post office facilities and Bulk Mail Entry Units (BMEU) spread throughout the United States. The mail is then sent from local post offices or BMEUs to central facilities known as sectional centers. At the sectional centers, high speed automated equipment sorts the large volumes of mail based on the destination post office or zip code for delivery.

Recently, the postal system has been used as a weapon of terror and fear by the inclusion of harmful chemical or biological contaminants, such as, for example, the spore-forming bacterium *Bacillus anthracis* (anthrax), within or on a mail piece. Such contaminants can be carried in several forms, including for example, a powder form. The harmful effects of only a few contaminated mail pieces can be far reaching, as cross-contamination of other mail pieces can easily occur when the mail pieces come in contact with each other or are passed through the same machines during sorting. The Centers for Disease Control and Prevention estimates that tens of thousands of mail pieces could have become cross-contaminated from only two contaminated mail pieces.

Ideally, it would be desirous for the postal authority to examine and/or test each piece of mail individually for any possible contaminants or harmful materials before it enters the mail system, thereby isolating any contaminated mail pieces and preventing any cross-contamination. With the large volume of mail processed daily, however, such an approach is not feasible due to the time and cost that such an undertaking would entail.

Another approach that can deter the inclusion of harmful materials within a mail piece would be the ability to accurately identify the origin of such a mail piece. Criminals that utilize the mail system to send hazardous materials rely on the anonymity of the mail system to avoid identification and capture. If the origin of a mail piece could be accurately identified, the anonymity of sending a letter via a postal service is removed, thereby allowing identification and prosecution of those people that commit such terrorist acts. While metered mail can be traced back to its originator, problems still exist in an environment in which mail is collected from multiple sources before being provided to a carrier for delivery. Such environments include, for example, the mail room of a corporation or business, or a mail room shared by multiple businesses within the same building (hereinafter referred to collectively as "corporate mail rooms" or "central mail rooms"). Corporate mail rooms handle a variety of items ranging from single letters to large mailings to parcels. Typically, mail pieces and parcels produced throughout a corporation or other business are placed at pick-up points for collection and delivery to a central or corporate mail room. At several times throughout the day the items from the various pick-up points are collected and brought to the central or corporate mail room for election of an appropriate carrier, application of postage, etc. The items are then provided to the appropriate carrier for delivery to the intended recipients.

While the use of a postage meter, such as, for example, a DM Series™ Mailing System manufactured by Pitney Bowes Inc., to generate and print an indicium evidencing payment of postage for each mail piece would allow each mail piece to be traced back to the corporation or business, it would not allow the specific individual that generated the mail piece to be identified. This presents problems, especially in an environment in which mail is aggregated for the purpose of application of postage and forwarding to a carrier such as a corporate mail room as described above. For example, the pick-up points within a corporation or business may not be a secure area, i.e., access to such an area may not be limited to only employees. Other people, such as, for example, contract workers, cleaning crews, security personnel, and repair personnel, can have access to such pick-up points, as well as visitors. As a result, there can be no guarantee that the individual responsible for the mail piece was actually an employee of the corporation or business. Furthermore, there is no guarantee that an employee of a corporation or business will not try to commit criminal acts via the postal system while hiding behind the anonymity created from within the corporate environment. It is, therefore, possible that a criminal could send a mail piece tainted with contaminants or other harmful materials from within a corporate environment without the fear of being accurately identified and prosecuted. Thus, there is no mechanism for tracing a mail piece back to the person that originated the mail piece within the corporate mail room environment.

Another problem that arises within the context of a corporate mail room is identification of the actual originator of each mail piece for the purposes of accounting. Specifically, many corporations desire to charge the costs associated with mail pieces back to a cost center for the originator's department or business unit. This allows the corporation to account for all of its expenses related to the mail room, as well as track the amount of mail originating from each department or business unit. In addition, such charge backs can be a deterrent to employees sending personal mail at the corporation's expense.

While the use of return address labels or completed forms attached to each mail piece can be used to identify the originator of a mail piece, such methods are both time consuming and easily bypassed. For example, if a form is utilized, the form can be completed utilizing false information, such as another's name. Return address labels, preprinted envelopes and the like can be lost, stolen or counterfeited, thereby removing any method of authenticating that the mail piece actually originated from the person identified in the return address.

Thus, there exists a need for a method and system that enables the accurate identification of the originator of a mail piece within a corporate mail room environment.

SUMMARY OF THE INVENTION

The present invention alleviates the problems associated with the prior art and provides a method and system that enables the accurate identification of the originator of a mail piece within a corporate mail room environment. Utilizing the present invention, the ambiguity of origination associated with mail items produced in a corporate mail room environment is removed by maintaining a record of the originator and/or originating equipment. The record can be maintained, for example, either in a database or directly on the mail item. Tracing of the originator of the mail item can be initiated based on information available from the mail item. In addition, the present invention provides the ability for a corporation to track other aspects of mail production, such as, for example, an originating cost center for charge back information, amount of mail generated by each individual within the corporation, equipment on which mail is being produced, and the like.

In accordance with the present invention, each person that generates mail items, i.e., employees of the corporation or any participating entity, is provided with tracking information to be placed on each mail item. The tracking information can include, for example, an employee identification number, an equipment identification number and a unique mail item identification number. The employee identification number identifies the originator, the equipment identification number identifies the equipment on which the mail item was generated, and the unique mail item identification number provides a unique identifier for each mail item and allows for the detection of copied tracking information. A sequence number generating system can provide the unique identification numbers by generating unique sequence numbers in an unpredictable manner, such as, for example, by using encryption algorithms, to make forging of a valid number difficult. Once a user has authenticated himself to the system, the system provides the tracking information to the user for inclusion on a mail item. The tracking information could be, for example, printed as a barcode either on a label or directly on a mail item. When the mail item is received in the corporate mail room, the tracking information is scanned and the tracking information is associated with a unique aspect of the mail item, such as, for example, the postage indicia (e.g., the postage meter identification), an image of the mail item, the date, or the destination address. This association could be maintained in a database or directly on the mail item itself, such as, for example, by including the tracking information within a portion of the postage indicium or by encrypting the originator's name and placing it in a barcode on the mail item. Utilizing the tracking information associated with each mail item, the ambiguity of origination of each mail item is removed as there is now a verifiable record of the originator and/or originating equipment.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
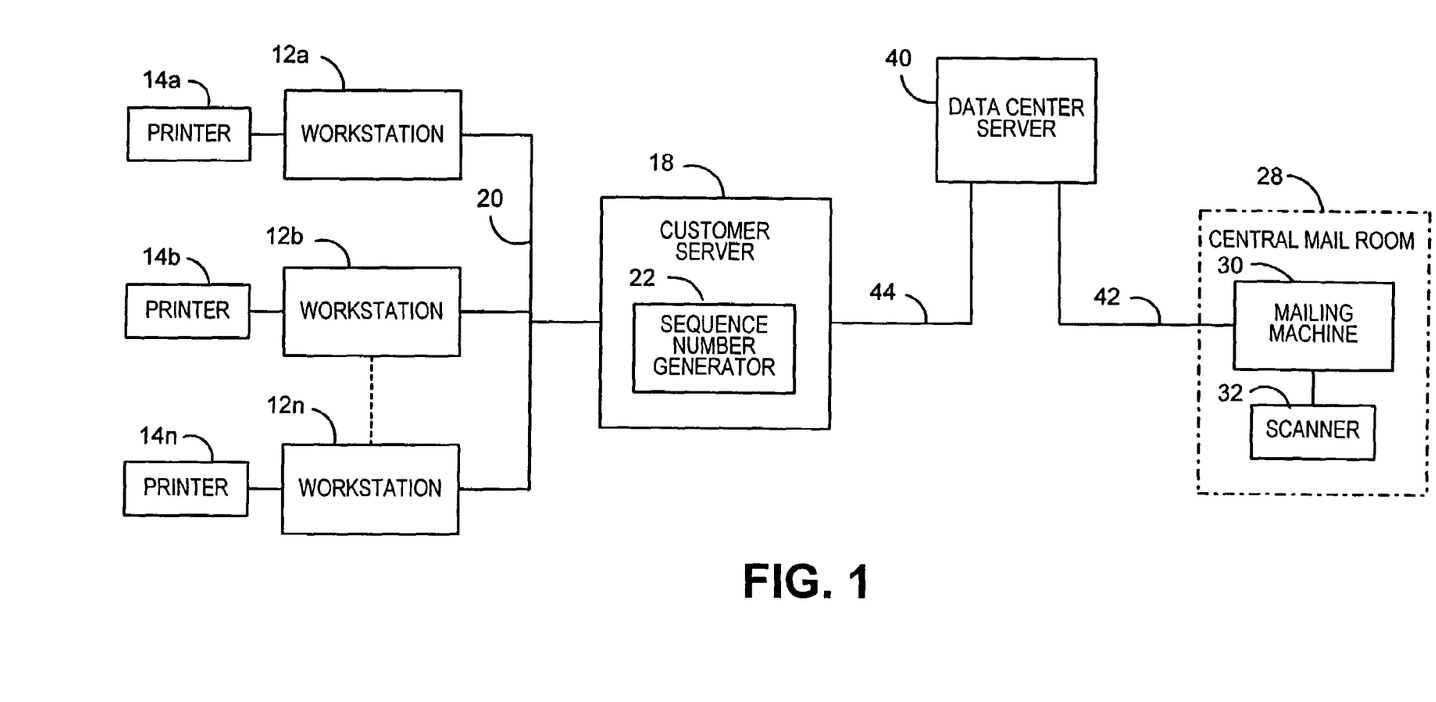
FIG. 1 illustrates in block diagram form a system that enables the accurate identification of the originator of a mail piece within a corporate mail room environment according to the present invention.

In describing the present invention, reference is made to the drawings, wherein there is seen in FIG. 1 a system 10 that enables the accurate identification of the originator of a mail item within a corporate mail room environment. The term mail item, as used herein, is not limited to letters, but also includes, for example, flats, postcards, packages, and the like. System 10 includes one or more workstations 12a-12n. While only three workstations 12a-12n are illustrated in FIG. 1, it should be understood that the number of workstations can be any number dependent upon the needs of the corporation or business in which the workstations are situated. Such workstations could be, for example, personal computers or docking stations (for laptop computers) located throughout a corporation or business. The workstations could be located in individual offices or in an area that allows general access, such as, for example, a business center. Each workstation 12a-12n is capable of being operated by a user to generate a mail item that the user desires to send utilizing a corporate mail room 28. Each workstation 12a-12n may be provided with an associated printer 14a-14n, which may be a general or special purpose printer, that can be utilized to print the mail item and corresponding envelope or address labels. Alternatively, of course, more than one workstation could share the same printer via a network or the like.

System 10 further includes a customer server 18 that communicates with one or more of the workstations 12a-12n via a data link 20. Data link 20 could be, for example, a Local Area Network (LAN) or the like. Server 18 includes a sequence number generator 22 utilized to generate tracking information for a mail item generated on a workstation 12a-12n as further described below. Optionally, each workstation 12a-12n could include a sequence number generator 22 to generate tracking information only for mail items generated on the respective workstation 12a-12n in which the sequence number generator 22 is installed.

System 10 further includes a mailing machine 30. Mailing machine 30 is preferably located in a central mail room 28 of the corporation or business in which the workstations 12a-12n are located. Typically, mail items, including letters, parcels and the like, generated on a workstation 12a-12n are placed at pick-up points for collection and delivery to the central corporate mail room 28 in which the mailing machine 30 is located. At several times throughout the day the mail items from the various pick-up points are collected and brought to the central corporate mail room 28 for processing by the mailing machine 30. Such processing includes, for example, selection of an appropriate carrier, application of postage, etc. The mail items are then provided to the appropriate carrier for delivery to the intended recipients. Preferably, the central mail room 28 is a secure area, i.e., access to the mail room 28 is controlled such that only authorized persons are permitted to enter. In this manner, access to mail items currently being processed within the mail room 28 is controlled, thereby providing assurance that the mail items will not be tampered with after they have been generated and delivered to the mail room 28.

Mailing machine 30 includes an associated scanner 32. Scanner 32 may be integral with the mailing machine 30, such that mail items are automatically scanned by the mailing machine 30 during processing, may be a peripheral device that provides automatic scanning, or may be a peripheral device that requires manual scanning. Mailing machine 30 can optionally communicate with a remote data center server 40 via a communication link 42. Communication link 42 can be, for example, via a network, such as the Internet, or a via telephone network. Data center server 40 can provide postal funds refills, perform remote diagnostics, download software for use by the mailing machine 30, including rate tables, etc., and provide other support for the mailing machine 30. Optionally, data center server 40 can communicate with the customer server 18 via a data link 44.

Figure 2:
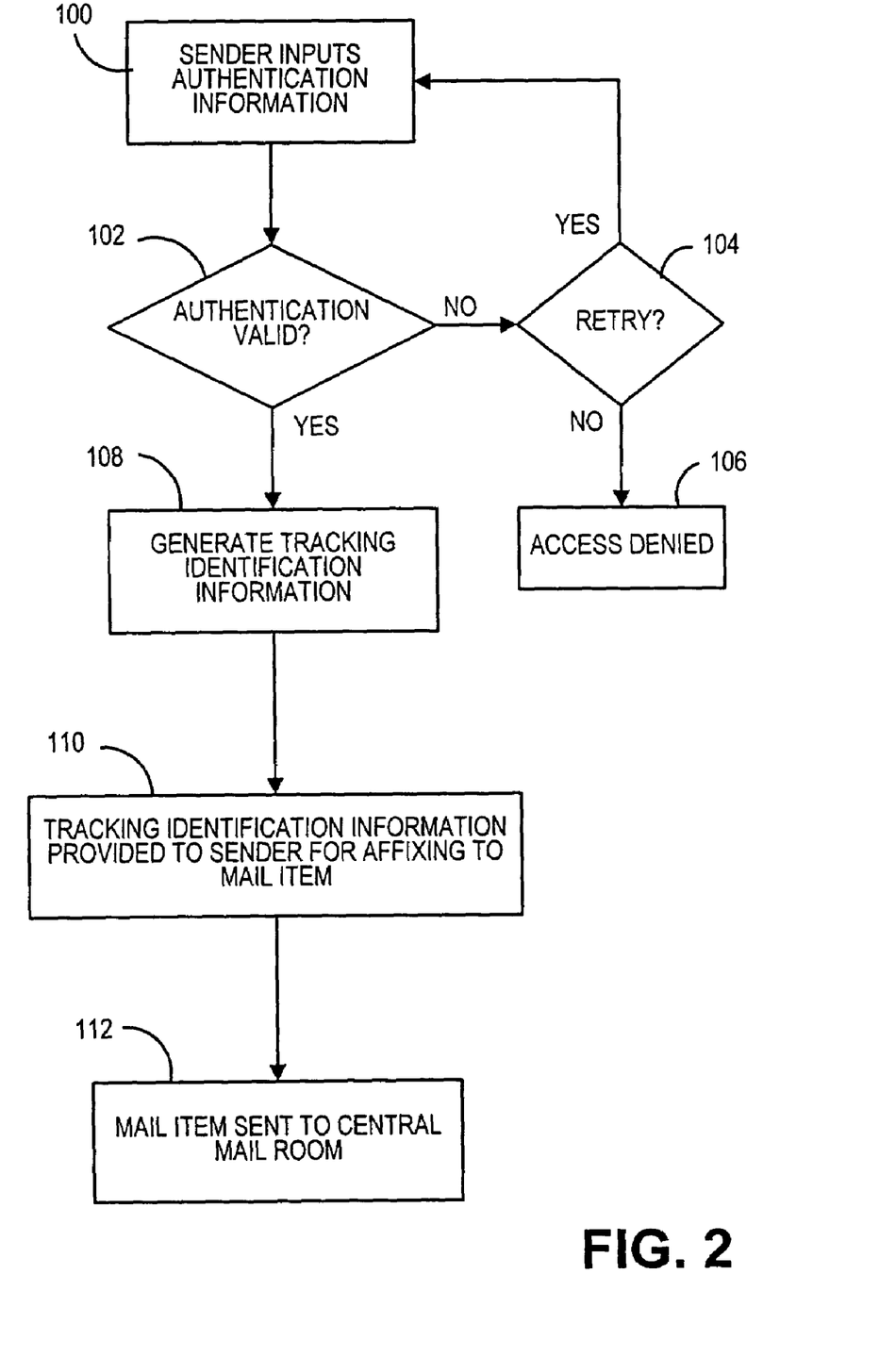
FIG. 2 illustrates in flow chart form the generation of a mail item according to the present invention.

The operation of the system 10 in accordance with the present invention will be described with respect to FIGS. 2-4. FIG. 2 illustrates in flow chart from the generation of a mail item utilizing the system 10 of the present invention. When a person, hereinafter referred to as the sender, desires to send a mail item utilizing the central mail room 28, in which the mailing machine 30 is located, to process the mail item, i.e., select a carrier (if not already specified by the sender), apply postage, etc., the mail item must be provided with tracking identification affixed to the mail item. The mail item could have been generated and printed by a workstation 12a-12n, or generated by another source. Those mail items not provided with appropriate tracking identification information will not be processed by the central mail room personnel, and will either be returned to the sender (if identifiable from the mail item) or placed aside for inspection to determine the sender for eventual return. The appropriate tracking identification information is provided by the server 18 in conjunction with the sequence number generator 22. For a sender to obtain the tracking identification information for placement on a mail item, the sender must first be authenticated by the server 18 as an authorized user. Thus, in step 100, the sender must input the required authentication information, thereby being granted access to the server 18 to obtain tracking identification information. The input of the authentication information can be accomplished utilizing one of the workstations 12a-12n. Thus, for example, in a corporation only those employees authorized to send mail, for which postage will be paid by the corporation, will be authorized to access the server 18 to obtain the necessary tracking identification information to have the letter processed by the corporate mail room 28. Sender authentication can be performed in any conventional manner, including, for example, via a user name or employee number and password, smart card or other form of secure token, biometric information, etc. The authentication information can be input utilizing an input device associated with a workstation 12a-12n, such as, for example, a keyboard, card reader, and the like.

In step 102, it is determined if the sender has properly authenticated himself to access the server 18. If the sender is not an authorized user or has not provided the proper authentication information, then in step 104 the sender will be notified of an improper authentication attempt and asked if a retry is desired. The sender may wish to retry if the authentication information was not input correctly or some other operator error occurred. If the sender desires to retry, then the processing is returned to step 100 for input of the authentication information. If the sender does not desire to retry, then in step 106 access to the server 18 is denied and the sender will not be able to obtain the tracking identification information necessary to send a mail item via the central mail room 28.

If in step 102 the sender has properly authenticated himself to access the server 18, then in step 108 the server will generate tracking identification information for the mail item desired to be sent by the sender. The tracking identification information preferably includes at least one or more, in any combination, of an identification of the sender or workstation 12a-12n or printer 14a-14n being used by the sender, and a unique mail item identification number, hereinafter referred to as a sequence number, generated by the sequence number generator 22. The sequence number could be, for example, unique for each mail item, i.e., a different sequence number for each mail item. Alternatively, the sequence number could be unique for each sender for a specified time period, such as, for example, one day. Thus, each mail item generated by a sender on the same day would have the same sequence number, but mail items generated on different days would have different sequence numbers. Alternatively, the sequence number could be unique for a predetermined piece count. Thus, for example, the first hundred mail items generated by a sender would have the same sequence number, the second hundred would have the same sequence number (different than the first hundred) and so forth. The tracking identification information could also include an indication of any special services requested by the sender (e.g. delivery confirmation, insurance, etc.) This information could also be stored on server 18. The sequence number can be, for example, any type of numeric, alphanumeric, or character string. The sender identification could be, for example, the user name or employee number input for authentication in step 100. Alternatively, the sender identification could be a name or number associated with the sender that is stored in the server 18. The sender identification can be retrieved by the server 18 upon successful authentication of the sender with the server 18. In this situation, the sender identification number could be kept secure, thereby reducing the possibility of forging tracking identification information. Alternatively, the tracking identification information need not include any identification associated with the sender, and instead an association between the sender and the sequence number maintained in a database, such as, for example, within the server 18. The sequence number generated by the sequence number generator 22 provides a unique identifier for the mail item, such that every mail item will have different tracking identification information. Accordingly, any improper reuse of valid tracking identification information can be detected. Optionally, the server 18 can log information related to the generation of the tracking identification information, including, for example, the date and time of the request, the workstation identification number, or other information desired to be maintained in a record.

Since it is desirable to maintain the confidentiality of the sender identification and the sequence number, thereby reducing the likelihood of forgery of valid tracking identification information, the sender identification and sequence number are preferably encrypted such that the appearance of the tracking identification information is unpredictable. By encrypting the tracking identification information, it will appear as a random code from one mail item to the next thereby making it less susceptible to attack and forgery. An encryption key can be securely stored within the server 18 for use in encrypting the tracking identification information. Additionally, the tracking identification information can optionally include a digital signature as another security layer. A digital signature could include, for example, a public key digital signature utilizing, for example, the Digital Signature Algorithm (DSA), the Rivest, Shamir Adleman (RSA) algorithm, or any other type of public key algorithm. Alternatively, the digital signature could include, for example, a message authentication code (MAC) utilizing secret key protocols. The tracking identification information could be signed by the server 18, or optionally by the workstation 12a-12n at which the sender is located. The use of a digital signature will allow verification of the tracking identification information to ensure it was validly issued by the server 18 or workstation 12a-12n. It should be noted that if desired, the tracking identification information can be either encrypted or digitally signed, can be both encrypted and signed, or neither encrypted nor signed.

In step 110, the tracking identification information generated by the server 18 is sent back to the workstation 12a-12n at which the sender is located. Optionally, as noted above, the workstation 12a-12n at which the sender is located can digitally sign the tracking identification information. The sender can then affix the tracking identification information received from the server 18 to the mail item desired to be sent. This can be performed by printing the tracking identification information directly on the mail item via a printer 14a-14n if the mail item is an envelope or the like that can be fed through the printer 14a-14n. Optionally, the printing of the tracking identification information could be integrated with addressing software such that the recipient address and tracking identification information are printed during the same pass of the envelope through the printer 14a-14n. Alternatively, the tracking identification information can be printed on a label via a printer 14a-14n and the label affixed to the mail item. The tracking identification information can be printed as a barcode or any other type of symbols, including an alpha-numeric code. A barcode can be either a one or two dimensional barcode. In step 112, the mail item, including the affixed tracking identification information, is sent to the central mail room 28 for processing as described further below with respect to FIG. 4.

Figure 3:
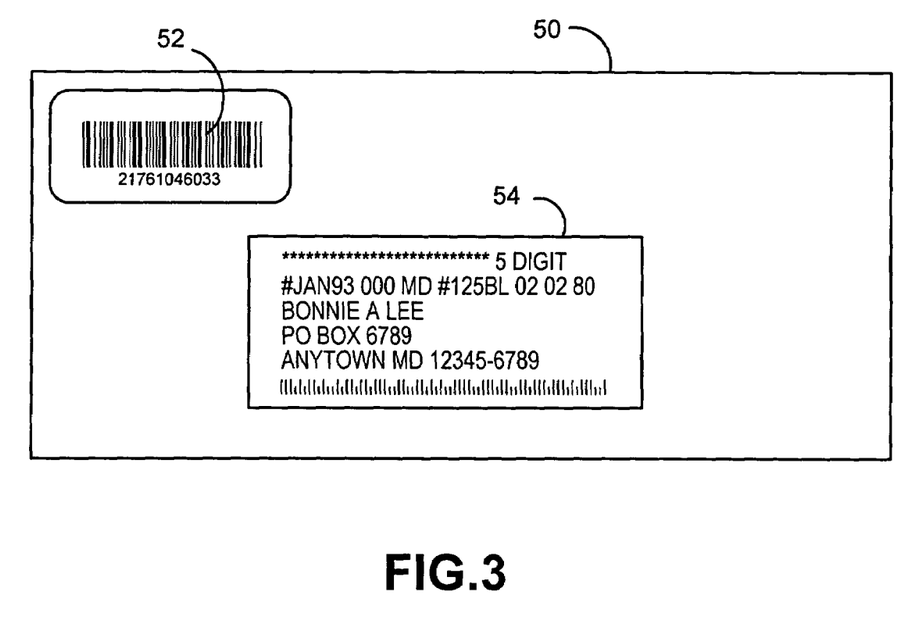
FIG. 3 illustrates an example of a mail item according to the present invention.

Referring now to FIG. 3, there is illustrated an example of a mail item, and more specifically an envelope 50, generated in accordance with the processing described with respect to FIG. 2. Envelope 50 is provided with a recipient address 54 and, according to the present invention, tracking identification information 52 printed, in this example, as a one-dimensional barcode and corresponding character string. The tracking identification information 52 of the present invention provides numerous advantages over conventional return address labels. For example, the tracking identification information 52 is unique for every mail item. Thus, the ability to forge or reuse tracking identification information is significantly reduced. The likelihood of forging appropriate tracking identification information is further reduced by the encryption and/or digital signature. Additionally, since the tracking identification information 52 cannot be generated by the server 18 unless the sender has been properly authenticated, this provides further safeguards against unauthorized use of the system 10. The multiple levels of security provided in accordance with the present invention provide a very high level of assurance that the employee associated with the tracking identification information 52 on a mail item is actually the employee that originated the mail item. This may not be the case with conventional return address labels, which can be easily forged, or lost or stolen and improperly used.

Figure 4:
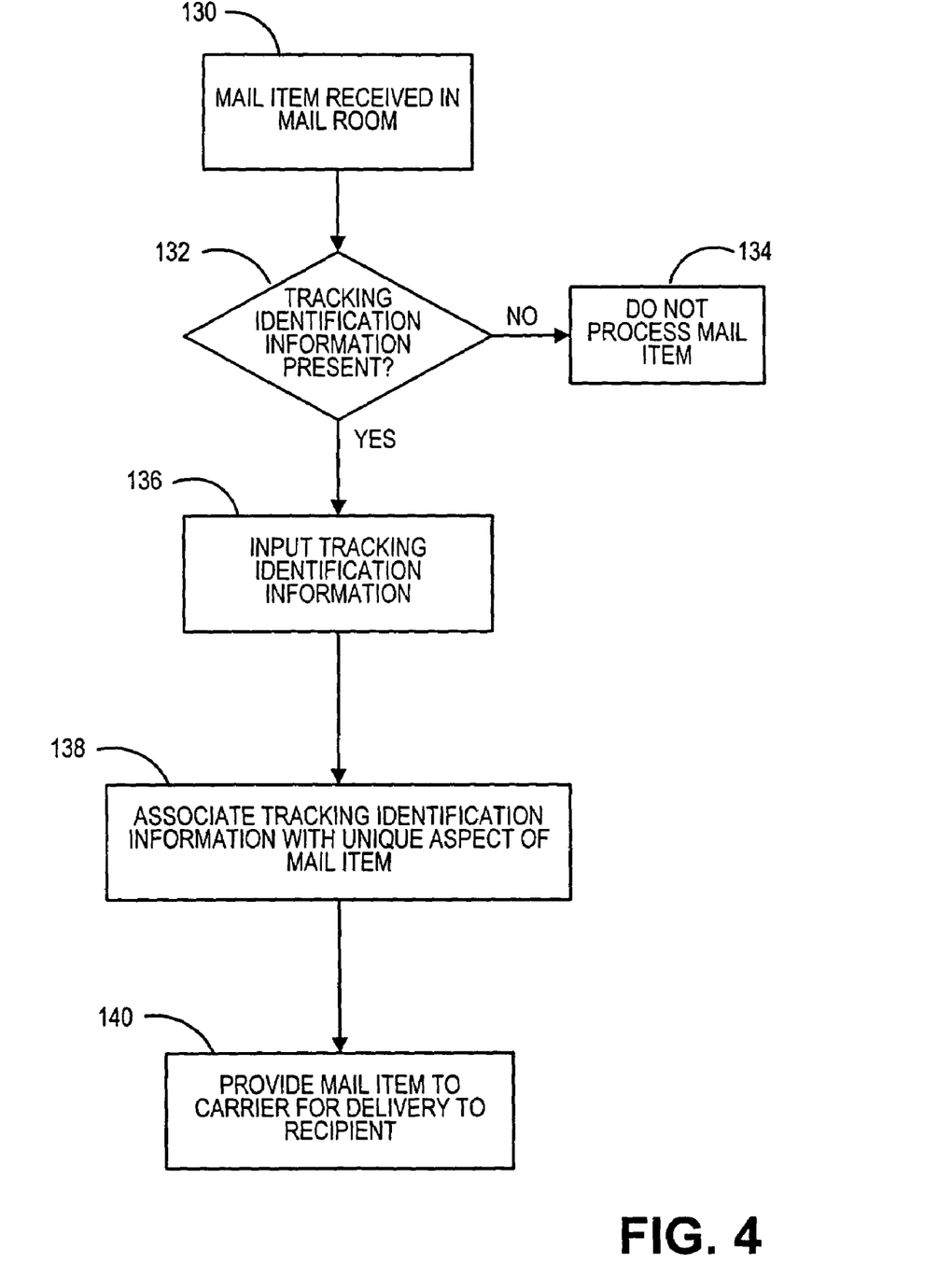
FIG. 4 illustrates in flow chart form the processing performed in the corporate mail room according to the present invention.

Referring now to FIG. 4, there is illustrated in flow chart form the processing performed in the central mail room 28 according to the present invention. In step 130 the mail item is received in the central mail room 28. In step 132, it is determined if tracking identification information is present on the mail item. This can be manually performed by a visual inspection by mail room personnel, or can also be performed automatically utilizing a scanner or the like. If in step 132 it is determined that the tracking identification information is not present on the mail item, then in step 134 the mail item will not be processed. The mail item can be returned to the sender (if identifiable) to have the necessary tracking identification information generated and affixed to the mail item. If the sender is not immediately identifiable from the mail item, the mail item can be placed aside for further investigation to determine the identity of the sender.

If in step 132 it is determined that the tracking identification information is present on the mail item, then in step 136 the tracking identification information is preferably input to the mailing machine 30. This can be performed, for example, utilizing the scanner 32 to scan the tracking identification information. The scanning can be performed either automatically or manually. Alternatively, if the tracking identification information is printed in a human readable format, it can be manually input via a keyboard or the like. Optionally, if the tracking identification information is encrypted and/or signed, the information can be decrypted and/or the signature can be verified.

In step 138, the tracking identification information is preferably associated with one or more unique aspects of the mail item and a record made that includes the tracking identification information and the one or more unique aspects of the mail item. Thus, the mail item is linked to the tracking identification information, from which the originator can be identified. The unique aspects of the mail item could include, for example, the indicium generated for the mail item (e.g., the postage meter identification), the date of processing (obtained, for example, from a real time clock within the mailing machine 30) and the destination address. The unique aspect information of the mail item could be retrieved utilizing the scanner 32, or input by an operator. If scanner 32 is capable of imaging the entire mail item, the unique aspect could be the image of the mail item. The record can be maintained in a database within the mailing machine 30. Alternatively, the record could be maintained in a database within the data center server 40 via communication link 42, or could be passed from the data center server 40 to the customer server 18, via communication link 44, and maintained in a database within the customer server 18. Optionally, the mailing machine 30 could be coupled directly to the customer server 18, thereby removing the need to pass the record through the data center server 40. Preferably, if the records for each mail item are maintained in a database, the records are digitally signed and encrypted to provide a level of privacy for the records and to protect the data against alteration. Optionally, if the records are maintained in a database, the tracking identification information originally affixed to the mail item could be destroyed, such as, for example, by removing the label or printing over the information to make it unreadable. In this manner, the use of the tracking identification information will not be readily apparent to anyone outside of the corporation, thereby adding another level of security against improper use of the central mail room 28 by third parties not authorized for such use. Since the record, providing an association between the tracking identification information and the mail item, is maintained in the database, the originator of the mail item can be identified in the event an investigation was warranted.

Alternatively, the association between the mail item and the tracking identification information could be maintained in a printed form, such as, for example, in a paper record maintained by mail room personnel or on the mail item itself. For example, the tracking identification information could be combined with the unique aspect of the mail item and the combination digitally signed and/or encrypted and included within the postage indicia or printed on some other area on the mail item. Additionally, based on the identification of the sender obtained from the tracking identification information, the sender's name could be encrypted and printed or affixed directly on the mail item, or printed in human readable text. In this way, the identity of the sender could be easily determined, such as, for example, by a law enforcement agency, without the need to retrieve the record of the mail item.

Once the tracking identification information has been associated with one or more unique aspects of the mail item, the processing of the mail item within the central mail room 28 can be completed, including the printing of an indicium evidencing payment of postage by the mailing machine 30, and in step 140 the mail item can be provided to the selected carrier for entry into the mail stream and delivery to the intended recipient. If the tracking identification information contains (or refers to in a database on server 18) a request for special services, the special services can be noted and the appropriate postage rate calculated and applied by mailing machine 30. It should be noted that, while preferable for added security and certainty in the determination of the originator of the mail item, the association of the tracking identification information with a unique aspect of the mail item in step 138 can be optional. Thus, in accordance with the present invention, the originator of the mail item can be determined utilizing information obtained from the mail item, even though the mail item entered the mail stream through a central mail room. The multiple security aspects of the present invention enable a forensic audit to demonstrate with a very high degree of certainty the identity of the originator or the equipment on which the mail item was generated.

Thus, for example, a law enforcement authority or governmental agency can determine the originator of a mail item processed by a central mail room type facility in several ways. For example, if the sender's name is encrypted (utilizing a public key) and printed on the mail item, the name could be decrypted (utilizing the corresponding private key). As another example, the central mail room that processed the mail item can be determined, such as, for example, by the serial number of the postage meter associated with mailing machine 30, which will be included in the indicium evidencing payment of postage. If the tracking identification information is still legible on the mail item, the identity of the sender or the identification of the workstation 12a-12n utilized to request the tracking identification information can be easily determined by the central mail room, utilizing the tracking number and the records maintained by the central mail room. If the tracking identification information has been removed from the mail item or is not legible, the record for that mail item can still be retrieved utilizing the unique aspect of the mail item associated with the tracking identification information. Once the tracking identification information associated with the mail item has been retrieved, the identity of the sender or the workstation 12a-12n utilized to request the tracking identification number can be determined. It should be noted that while a determination of the workstation utilized to request the tracking identification number may not necessarily identify the actual sender, in can help to narrow the search in the event of an investigation into the identity of the sender. Of course, securing each of the workstations 12a-12n with a password such that access to the workstations 12a-12n is limited to only those with a valid password would provide further security against counterfeiting and narrow the search once an identification of the specific workstation has been made. Additionally, allowing the customer server 18 to communicate only with identified workstations 12a-12n will prevent a request for tracking identification information from a remote location from being processed. Thus, it will not be possible for a former employee to attempt to harm the organization by printing and sending a contaminated mail item that will be associated with the organization.

The tracking identification information of the present invention also provides a corporation or business with the ability to accurately track all aspects of mail production by its employees. For example, utilizing the present invention, it is possible for a corporation to monitor the mail items being generated by each employee, which can be used for accounting purposes and to ensure that employees are not using postage paid for by the corporation for personal mail. Additional rules and protocols could be implemented to prevent the unauthorized use of the corporate or central mail room. For example, the customer server 18 could require the sender to provide a code that describes the contents of the mail item before generating the tracking identification information. This information can be stored in the record made for the mail item, and provides additional information to the corporation as to the type and amount of mail generated by each employee. The present invention also enables a corporation to track the equipment on which a mail item was generated, the time of day the mail item was generated, and other aspects that can enable the corporation to more effectively engineer the flow of communication. The tracking identification information of the present invention can also enable a corporation to comply with requirements established by the postal authority to qualify for discounted postage rates based on traceable mail.

Thus, according to the present invention, the ambiguity of origination associated with mail items produced in a corporate mail room environment is removed by maintaining a record of the originator and/or originating equipment. The record for a particular mail item can be retrieved based on information on the mail item itself, or based on one or more unique aspects of the mail item. The use of encryption and digital signatures enable a forensic audit to demonstrate with a very high degree of certainty the identity of the originator or the equipment on which the mail item was generated.

While the present invention has been described with respect to a corporate or central mail room environment for a business, it should be understood that the present invention is not so limited and can be utilized in any application in which mail from several originators is aggregated for processing. Such applications could include, for example, group secretarial services, mailing houses, kiosks, hotel business centers, and the like. For those applications in which employee identification numbers are not applicable, the tracking identification information could include at least a portion of any one or more of a credit card number, a driver's license number, a passport number, a national identification card number, etc., a hotel room number and date, biometric information, or other information from which the identity of the sender could be determined. Those skilled in the art will also recognize that various modifications can be made without departing from the spirit of the present invention. For example, if the printers 14a-14n are also capable of printing an indicium evidencing payment of postage, such as, for example, in a networked meter environment, then the sender could be given the option to print the postage indicium at the same time the tracking identification information is created. In this case, the indicium itself could serve as the sequence number and the postage meter could log the name of the sender that created the indicium or encode the sender's name or identification in the indicium. Since the indicium is digitally signed, a forensic audit can demonstrate with a very high degree of certainty the identity of the originator.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing a mail item comprising:
    determining if the mail item is provided with tracking identification information including at least one of an identifier associated with a sender of the mail item and an identifier associated with equipment used to generate the mail item, the tracking identification information further including a unique identification number;
    if the mail item is provided with tracking identification information, associating the tracking identification information with a unique aspect of the mail item;
    generating a record of the association between the tracking identification information and the unique aspect of the mail item; and
    providing the mail item to a carrier for delivery.

2. The method of claim 1, wherein determining if the mail item is provided with tracking identification information further comprises:
    scanning the mail item to determine if the mail item is provided with tracking identification information.

3. The method of claim 1, wherein determining if the mail item is provided with tracking identification information further comprises:
    manually inspecting the mail item to determine if the mail item is provided with tracking identification information.

4. The method of claim 1, wherein the identifier associated with the sender includes an employee identification number.

5. The method of claim 1, wherein the identifier associated with the sender includes a user name.

6. The method of claim 1, wherein the identifier associated with the sender includes biometric information.

7. The method of claim 1, wherein the identifier associated with the sender includes at least a portion of a credit card number.

8. The method of claim 1, wherein the identifier associated with the sender includes at least a portion of a driver's license number.

9. The method of claim 1, wherein the tracking identification information is printed on the mail item.

10. The method of claim 1, wherein the tracking identification information is printed on a label affixed to the mail item.

11. The method of claim 1, wherein the tracking identification information is encrypted, and determining if the mail item is provided with tracking identification information further comprises:
    decrypting the encrypted tracking identification information.

12. The method of claim 1, wherein the tracking identification information is digitally signed, and determining if the mail item is provided with tracking identification information further comprises:
    verifying the digital signature.

13. The method of claim 1, wherein the unique aspect of the mail item includes an indicium generated for the mail item.

14. The method of claim 1, wherein the unique aspect of the mail item includes a destination address of the mail item.

15. The method of claim 14, wherein the unique aspect of the mail item further includes a date of processing the mail item.

16. The method of claim 1, wherein the unique aspect of the mail item includes an image of the mail item.

17. The method of claim 1, wherein generating a record further comprises:
    storing the record in a database.

18. The method according to claim 17, wherein storing the record in a database further comprises:
    encrypting the record and storing the encrypted record in the database.

19. The method according to claim 17, wherein storing the record in a database further comprises:
    digitally signing the record and storing the digital signature along with the record in the database.

20. The method of claim 17, wherein before providing the mail item to a carrier, the method further comprises:
    destroying the tracking identification information provided on the mail item.

21. The method of claim 1, wherein generating a record further comprises:
    combining the tracking identification information with the unique aspect of the mail item;
    encrypting the combination of the tracking identification information and the unique aspect of the mail item; and
    affixing the encrypted combination to the mail item.

22. The method of claim 21, wherein affixing the encrypted combination to the mail item further comprises:
    printing the encrypted combination on the mail item.

23. The method of claim 21, wherein affixing the encrypted combination to the mail item further comprises:
    including the encrypted combination within a postage indicium generated for the mail item.

24. The method of claim 21, further comprising:
    digitally signing the encrypted combination before affixing the encrypted combination to the mail item.

25. The method of claim 1, wherein before providing the mail item to a carrier, the method further comprises:
    determining the sender's name based on the tracking identification information;
    encrypting the sender's name; and
    affixing the encrypted sender's name to the mail item.

26. The method of claim 1, wherein the tracking identification information is a barcode.

27. The method of claim 1, wherein the tracking identification information further includes an indication of special services requested for the mail item.

28. A method for processing a mail item comprising:
    receiving a request for tracking identification information from a sender for the mail item;

generating a postage indicium for the mail item;

generating the tracking identification information, the tracking identification information including at least one of an identifier associated with the sender and an identification associated with equipment from which the request is made, the tracking identification information further including a unique identification number, at least a portion of the postage indicium being as the unique identification number;

generating a record associating the identification associated with the sender and the postage indicium;

storing the record; and returning the tracking identification information to the sender for affixing to the mail item.

29. The method of claim 28, wherein receiving a request for tracking information further comprises:

receiving authentication information from the sender;

determining if the authentication information is valid; and if the authentication information is valid, generating the tracking identification information.

30. The method of claim 29, wherein the authentication information includes at least one of a user name and password.

31. The method of claim 29, wherein the authentication information includes at least one of an employee identification number and password.

32. The method of claim 29, wherein the authentication information includes biometric information.

33. The method of claim 29, wherein the identifier associated with the sender includes a least a portion of the authentication information.

34. The method of claim 29, further comprising:

retrieving the identifier associated with the sender based on the authentication information.

35. The method of claim 28, wherein the identifier associated with the sender includes an employee identification number.

36. The method of claim 28, wherein the identifier associated with the sender includes a user name.

37. The method of claim 28, wherein the identifier associated with the sender includes biometric information.

38. The method of claim 28, wherein the identifier associated with the sender includes at least a portion of a credit card number.

39. The method of claim 28, wherein the identifier associated with the sender includes at least a portion of a driver's license number.

40. The method of claim 28, wherein generating the tracking identification information further comprises:

encrypting the tracking identification information.

41. The method of claim 28, wherein generating the tracking identification information further comprises:

digitally signing the tracking identification information.

42. The method of claim 28, wherein the request is received from a remote workstation.

43. The method of claim 28, wherein the tracking identification information is generated within a workstation being used by the sender.

44. The method according to claim 28, further comprising: storing information related to the request for tracking identification information.

45. The method according to claim 44, wherein the information related to the request includes a date and time of the request.

46. The method according to claim 44, wherein the information related to the request includes an identification of a workstation from which the request was made.

47. The method according to claim 44, wherein the information related to the request includes an identification of a printer on which at least a portion of the mail item was printed.

48. The method according to claim 28, further comprising:

printing the tracking identification information on the mail item.

49. The method according to claim 28, further comprising:

printing the tracking identification information on a label for affixing to the mail item.

50. The method of claim 28, wherein the request for tracking identification information includes a code that describes the mail item contents.

51. The method according to claim 28, further comprising:

encoding the identifier associated with the sender into the postage indicium.

52. The method according to claim 28, wherein the tracking identification information further includes an indication of special services requested for the mail item.

53. A method for processing a mail item comprising:

receiving a request for tracking identification information from a sender for the mail item;

generating the tracking identification information, the tracking identification information including a unique identifier;

encrypting the tracking identification information;

generating a record associating the unique identifier with an identification associated with the sender;

storing the record in a database; and returning the encrypted tracking identification to the sender for affixing to the mail item.

54. The method of claim 53, wherein the identifier associated with the sender includes an employee identification number.

55. The method of claim 53, wherein the identifier associated with the sender includes a user name.

56. The method of claim 53, wherein the identifier associated with the sender includes biometric information.

57. The method of claim 53, wherein generating the tracking identification information further comprises:

digitally signing the tracking identification information.

58. A method for processing a mail item comprising:

generating tracking identification information for affixing to the mail item, the tracking identification information including at least one of an identifier associated with a sender of the mail item and an identifier associated with equipment used to generate the mail item, the tracking identification information further including a unique identification number and a digital signature;

verifying the digital signature;

if the digital signature is verified, associating the tracking identification information with a unique aspect of the mail item;

generating a record of the association between the tracking identification information and the unique aspect of the mail item; and storing the record.

59. A mail processing system for a central mail room comprising:

a server, the server including a sequence number generator;

a plurality of workstations coupled to the server, each of the plurality of workstations being operable by a sender of a mail item to request tracking identification information from the server, the tracking identification information including at least one of an identifier associated with the sender of the mail item and an identifier associated with the workstation being operated by the sender, the tracking identification information further including a unique identification number generated by the sequence number generator; and a mailing machine to process mail items for delivery to a carrier, wherein when a mail item is processed by the mailing machine, the tracking identification information affixed to the mail item is associated with a unique aspect of the mail item and a record of the association between the tracking identification information and the unique aspect of the mail item is stored in a database associated with the mailing machine, thereby allowing the sender of the mail item to be identified.

60. The system of claim 59, wherein the identifier associated with the workstation includes an identification of a printer used to print at least a portion of the mail item.

61. The system of claim 59, wherein the tracking identification information is printed on the mail item as a barcode, and the mailing machine further comprises:

an associated scanner to scan the barcode.

62. The system of claim 59, wherein the identifier associated with the sender includes an employee identification number.

63. The system of claim 59, wherein the identifier associated with the sender includes a user name.

64. The system of claim 59, wherein the identifier associated with the sender includes biometric information.

65. The system of claim 59, wherein the identifier associated with the sender includes at least a portion of a credit card number.

66. The system of claim 59, wherein the identifier associated with the sender includes at least a portion of a driver's license number.

67. The system of claim 59, wherein the tracking identification information is encrypted.

68. The system of claim 59, wherein the tracking identification information includes a digital signature.

69. The system of claim 59, wherein the record of the association between the tracking identification information and the unique aspect of the mail item is encrypted and digitally signed before being stored in the database associated with the mailing machine.

* * * * *